United States Patent
Coleman et al.

(10) Patent No.: US 7,239,975 B2
(45) Date of Patent: *Jul. 3, 2007

(54) METHOD AND SYSTEM FOR AUTOMATIC STABILIZATION AND POINTING CONTROL OF A DEVICE

(75) Inventors: Norman Coleman, Picatinny Arsenal, NJ (US); George Papanagopoulos, Picatinny Arsenal, NJ (US); Ken Lam, Picatinny Arsenal, NJ (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/212,062

(22) Filed: Aug. 24, 2005

(65) Prior Publication Data

US 2006/0265120 A1  Nov. 23, 2006

Related U.S. Application Data

(60) Provisional application No. 60/667,526, filed on Apr. 2, 2005.

(51) Int. Cl.
*G06F 15/00* (2006.01)

(52) U.S. Cl. ...................................... 702/153; 702/150

(58) Field of Classification Search ........... 348/208.14; 434/1, 17, 19; 702/127, 150, 182, 184, 15
See application file for complete search history.

(56) References Cited

U.S. PATENT DOCUMENTS

| 5,927,648 A * | 7/1999 | Woodland ................. 244/118.1 |
| 6,219,614 B1 * | 4/2001 | Uchigaki et al. ........... 701/211 |
| 6,596,976 B2 * | 7/2003 | Lin et al. ..................... 244/3.2 |

* cited by examiner

*Primary Examiner*—John Barlow
*Assistant Examiner*—Douglas N. Washburn
(74) *Attorney, Agent, or Firm*—Raymond Y. Chan; David and Raymond Patent Group

(57) ABSTRACT

The present invention provides a method and system for an innovative design of the automatic stabilization and pointing control of a device based on the MEMS technology, which is small enough and has acceptable accuracy to be integrated into many application systems, such as, laser pointing systems, telescopic systems, imaging systems, and optical communication systems. The stabilization mechanism configuration design is based on utilization of AGNC commercial products, the coremicro IMU and the coremicro AHRS/INS/GPS Integration Unit. The coremicro AHRS/INS/GPS Integration Unit is used as the processing platform core for the design of the MEMS coremicro IMU based stabilization mechanism.

18 Claims, 8 Drawing Sheets

METHOD AND SYSTEM FOR AUTOMATIC STABILIZATION AND POINTING CONTROL OF A DEVICE

CROSS REFERENCE OF RELATED APPLICATION

This is a regular application of the provisional application having an application number of No. 60/667,526 and a filing date of Apr. 2, 2005.

BACKGROUND OF THE PRESENT INVENTION

1. Field of the Present Invention

The present invention relates to a controlling method and system for positioning measurement, and more particularly to a method and system for automatic stabilization and pointing control of a device that needs to be pointed at a determined direction, wherein output data of an IMU (Inertial Measurement Unit) installed in the device and target information date are processed to compute a platform rotation command to an actuator; the actuator rotates and stabilizes the device into the determined direction according to the platform rotation commands; a visual and voice device provide a user with visualization and voice indication of the automatic stabilization and pointing control procedure of the device.

The present invention relates to an innovative design of the automatic stabilization and pointing control of a device based on the MEMS technology, which is small enough and has acceptable accuracy to be integrated into many application systems, such as, laser pointing systems, telescopic systems, imaging systems, and optical communication systems. The stabilization mechanism configuration design is based on utilization of AGNC commercial products, the coremicro IMU and the coremicro AHRS/INS/GPS Integration Unit. The coremicro AHRS/INS/GPS Integration Unit is used as the processing platform core for the design of the MEMS coremicro IMU based automatic stabilization and pointing control of a device.

2. Description of Related Arts

In many applications, a user needs to command a device to be pointed and stabilized with specified orientation. For example, an antenna or a transmitter and receiver beam in a mobile communication system carried in a vehicle needs to be pointed at a communication satellite in orbit in dynamic environments. Or, a gun turret or a sniper rifle in the hands of a warrior of an Army elite sniper team needs to be pointed at a hostile target in a complex environment. A measurement device in a land survey system needs to be pointed at a specific direction with precision and stabilized.

Conventional systems for automatic stabilization and pointing control of a device are usually bigger, heavier, use more power, are more costly, and are used only in large military weapon systems, or commercial equipment, which systems use conventional expensive, large, heavy, and high power consumption spinning iron wheel gyros and accelerometers as motion sensing devices. The platform body of the systems must be large enough and strong enough to accommodate the gyros (and sometimes the accelerometers as well), so large gimbals with large moments of inertia must be used to support the platform. This in turn requires powerful torque motors to drive the gimbals. The result is that we have gimbaled systems for automatic stabilization and pointing control of a device whose cost, size, and power prohibit them from use in the emerging commercial applications, including phased array antennas for mobile communication systems. This is mostly due to the size and weight of the inertial sensors in the gimbaled systems for automatic stabilization and pointing control of a device.

Conventional gyros and accelerometers, which are commonly used in inertial systems to sense rotation and translation motion of a carrier, include: Floated Integrating Gyros (FIG), Dynamically-Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), Pulsed Integrating Pendulous Accelerometer (PIPA), Pendulous Integrating Gyro Accelerometer (PIGA), etc.

New horizons are opening up for inertial sensor technologies. MEMS (MicroElectronicMechanicalSystem) inertial sensors offer tremendous cost, size, and reliability improvements for imaging guidance, navigation, tracking, pointing stabilization and control systems, compared with conventional inertial sensors. It is well known that the silicon revolution began over three decades ago, with the introduction of the first integrated circuit. The integrated circuit has changed virtually every aspect of our lives. The hallmark of the integrated circuit industry over the past three decades has been the exponential increase in the number of transistors incorporated onto a single piece of silicon. This rapid advance in the number of transistors per chip leads to integrated circuits with continuously increasing capability and performance. As time has progressed, large, expensive, complex systems have been replaced by small, high performance, inexpensive integrated circuits. While the growth in the functionality of microelectronic circuits has been truly phenomenal, for the most part, this growth has been limited to the processing power of the chip.

MEMS, or, as stated more simply, micromachines, are considered the next logical step in the silicon revolution. It is believed that this next step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

MEMS exploits the existing microelectronics infrastructure to create complex machines with micron feature sizes. These machines can have many functions, including sensing, communication, and actuation. Extensive applications for these devices exist in a wide variety of commercial systems.

Micromachining utilizes process technology developed by the integrated circuit industry to fabricate tiny sensors and actuators on silicon chips. In addition to shrinking the sensor size by several orders of magnitude, integrated electronics can be added to the same chip, creating an entire system on a chip. This instrument will result in, not only the redesign of conventional military products, but also new commercial applications that could not have existed without small, inexpensive inertial sensors.

Recent advances in the solid-state MEMS technology make it possible to build a very small, light-weight, low-power, and inexpensive IMU. The coremicro IMU patented product employs the MEMS technology to provide angle increments (i.e., rotation rates), velocity increments (i.e., accelerations), a time base (sync) in three axes and is capable of withstanding high vibration and acceleration. The coremicro IMU is a low-cost, high-performance motion sensing device (made up of 3 gyros and 3 accelerometers) measuring rotation rates and accelerations in body-fixed axes.

Therefore, it is possible to develop an automatic stabilization and pointing control of a device incorporating the MEMS IMU technologies that create a lightweight miniature gimbaled system for a physical inertially-stable platform. When mounted on a vehicle, the platform points to a fixed direction in inertial space, that is, the motion of the vehicle is isolated from the platform. In practice, a two-axis pointing stabilization mechanism has two coupled servo control loops.

SUMMARY OF THE PRESENT INVENTION

The main objective of the present invention is to provide a method and system for pointing and stabilizing a device which needs to be pointed and stabilized with a determined orientation, wherein output signals of an inertial measurement unit and the desired direction information are processed to compute platform rotation commands to an actuator; the actuator rotates and stabilizes the device at the desired direction according to the platform rotation commands.

Another objective of the present invention is to provide a method and system for pointing and stabilizing a device, which needs to be pointed and stabilized at a desired orientation, wherein a visual and voice device is attached to provide a user with visualization and voice indications of targets and the pointing and stabilization operational procedure.

Another objective of the present invention is to provide a method and system for pointing and stabilizing a device which needs to be pointed and stabilized with a determined orientation, wherein the pointing and stabilization system has increased accuracy that an increase in the system's ability to reproduce faithfully the output pointing direction dictated by the desirable direction.

Another objective of the present invention is to provide a method and system for pointing and stabilizing a device, which can reduce sensitivity to disturbance, wherein the fluctuation in the relationship of system output pointing direction to the input desirable direction caused by changes within the system are reduced. The values of system components change constantly through their lifetime, but using the self-correcting aspect of feedback, the effects of these changes can be minimized. The device to be pointed is often subjected to undesired disturbances resulting from structural and thermal excitations. To aggravate the problem, disturbance profiles throughout the mission may have different characteristics.

Another objective of the present invention is to provide a method and system for pointing and stabilizing a device, which is more smoothing and filtering that the undesired effects of noise and distortion within the system are reduced.

Another objective of the present invention is to provide a method and system for pointing and stabilizing a device, which can increase bandwidth that the bandwidth of the system is defined as a range of frequencies or changes to the input desired direction to which the system will respond satisfactorily.

Another objective of the present invention is to provide a method and system for pointing and stabilizing a device, wherein the pointed and stabilized device may be very diverse, including:

(a) Antennas for a wireless communication system,
(b) Radar beams,
(c) Laser beam, leaser pointing system,
(d) Gun barrels, including gun turret, mortar, artillery, sniper rifles, machine guns,
(e) Measurement devices for a land survey.
(f) Optical pointing camera
(g) Optical communication devices.
(h) Telescopic systems,
(i) Imaging systems,
(j) Optical communication systems.

Another specific objective of the present invention is to provide a method and system for an innovative design of the automatic stabilization and pointing control of a device based on the MEMS IMU technology, which is small enough and has acceptable accuracy to be integrated into many application systems. The automatic stabilization and pointing control configuration design is based on utilization of AGNC commercial products, the coremicro IMU and the coremicro AHRS/INS/GPS Integration Unit. The coremicro AHRS/INS/GPS Integration Unit is used as the processing platform core for the design of the MEMS coremicro IMU based stabilization mechanism.

DETAIL DESCRIPTION OF THE PREFERRED EMBODIMENT

Figure 1:
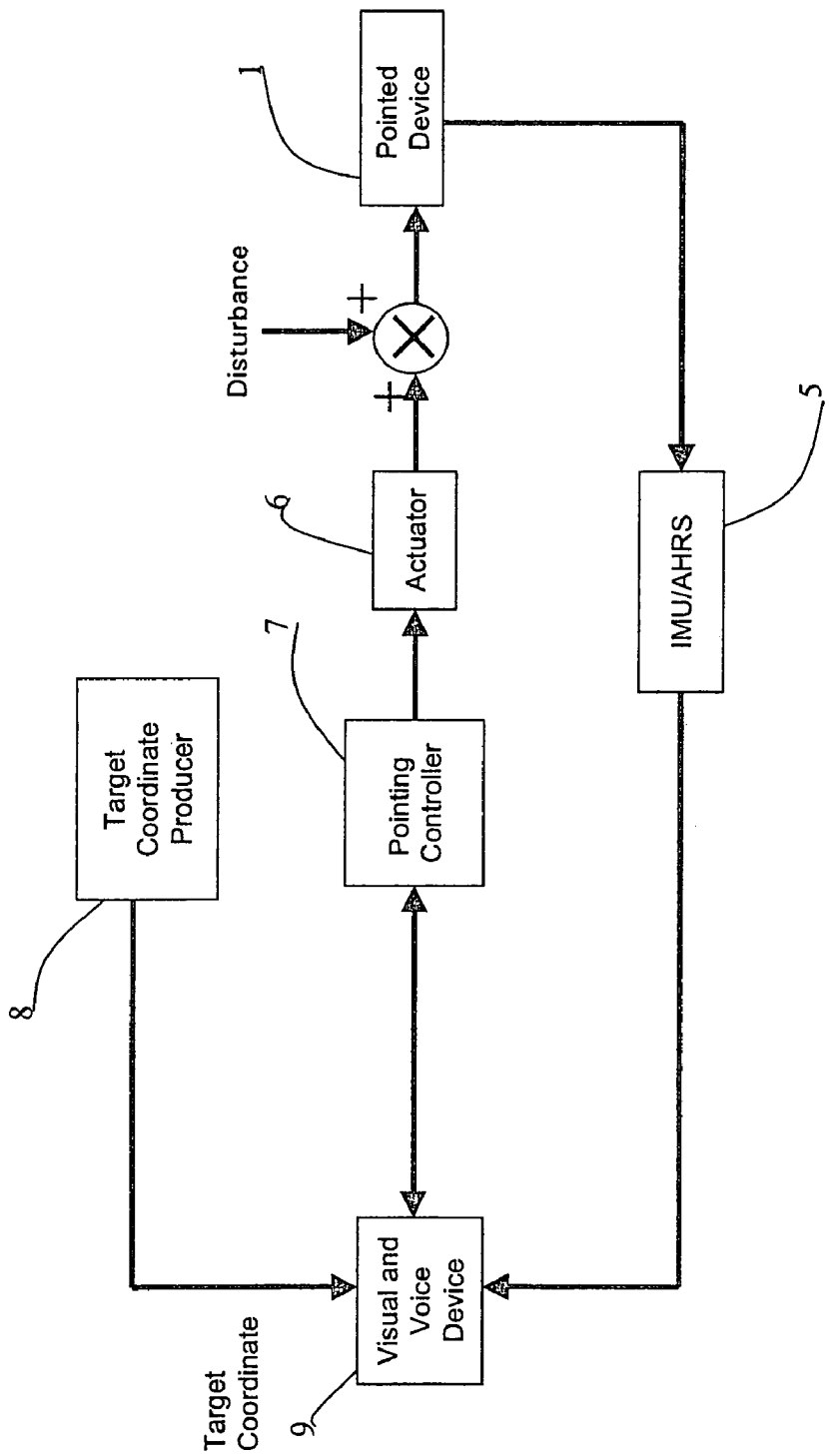
FIG. 1 is a block diagram illustrating the system according a preferred embodiment of the present invention.

Referring to FIGS. 1 to 9, a method and system for pointing and stabilizing a device, which needs to be pointed and stabilized at a determined orientation, according to a preferred embodiment of the present invention is illustrated.

Rapid advance in MEMS technologies makes it possible to fabricate low cost, lightweight, miniaturized size, and low power gyros and accelerometers. "MEMS" stands for "MicroElectroMechanical Systems", or small integrated electrical/mechanical devices. MEMS devices involve creating controllable mechanical and movable structures using IC (Integrated Circuit) technologies. MEMS includes the concepts of integration of Microelectronics and Micromachining. Examples of successful MEMS devices include inkjet-printer cartridges, accelerometers that deploy car airbags, and miniature robots.

Microelectronics, the development of electronic circuitry on silicon chips, is a very well developed and sophisticated technology. Micromachining utilizes process technology developed by the integrated circuit industry to fabricate tiny sensors and actuators on silicon chips. In addition to shrinking the sensor size by several orders of magnitude, integrated electronics can be placed on the same chip, creating an entire system on a chip. This instrument will result in, not only a revolution in conventional military and commercial products, but also new commercial applications that could not have existed without small, inexpensive inertial sensors.

MEMS (MicroElectronicMechanicalSystem) inertial sensors offer tremendous cost, size, reliability improvements for guidance, navigation, and control systems, compared with conventional inertial sensors.

American GNC Corporation, Simi Valley, Calif., invented MEMS angular rate sensors and MEMS IMUs (Inertial Measurement Units), referring to US patents, "MicroElectroMechanical System for Measuring Angular Rate", U.S. Pat. No. 6,508,122; "Processing Method for Motion Measurement", U.S. Pat. No. 6,473,713; "Angular Rate Producer with MicroElectroMechanical System Technology", U.S. Pat. No. 6,311,555; "Micro Inertial Measurement Unit", U.S. Pat. No. 6,456,939. Either the micro IMU or the coremicro IMU is "The world's smallest" IMU, and is based on the combination of solid state MicroElectroMechanical Systems (MEMS) inertial sensors and Application Specific Integrated Circuits (ASIC) implementation. The coremicro IMU is a fully self contained motion-sensing unit. It provides angle increments, velocity increments, a time base (sync) in three axes and is capable of withstanding high vibration and acceleration. The coremicro IMU is opening versatile commercial applications, in which conventional IMUs can not be applied. They include land navigation, automobiles, personal hand-held navigators, robotics, marine users and unmanned air users, various communication, instrumentation, guidance, navigation, and control applications.

The coremicro IMU makes it possible to build a low-cost, low-weight, and small-size automatic stabilization and pointing control of a device.

It is worth to mention that although the coremicro IMU is preferred for the present invention, the present invention is not limited to the coremicro IMU. Any IMU device with such specifications can be used in the system of the present invention.

Referring to FIG. 1, the automatic stabilization and pointing control system of the present invention for a device comprises an attitude producer 5, a target coordinate producer 8, a pointing controller 7, an actuator 6, and a visual and voice device 9.

The attitude producer 5 includes an IMU/AHRS (Inertial Measurement Unit/Attitude and Heading Reference System) device or GPS (Global Positioning System) attitude receiver for determining current attitude and attitude rate measurements of a device 1.

The target coordinate producer 8 is adapted for measuring the desired point direction of the device 1 by capturing and tracking a target.

The pointing controller 7 is adapted for computing platform rotation commands to an actuator 6 using the desired pointing direction of the device and the current attitude measurement of the device 1 to rotate the device 1.

The actuator 6 is adapted for rotating the device 1 to the desired pointing direction.

The visual and voice device 9, which can be a hand-held or head-up device or others, is adapted for providing the operator with audio and visual means to improve his/her decision, including displaying the desired pointing direction and current attitude of the device, target trajectory, and producing a voice representing the pointing procedure.

The automatic stabilization and pointing control system of the present invention is a feedback control system. The operator uses the target coordinate producer 8 to capture and track a target to measure the desired point direction of the pointed device 1. The IMU/AHRS 5 is used to measure the current attitude of the pointed device 1. Using errors between the desired point direction and current direction of the pointed device 1, the pointing controller 7 determines platform rotation commands to the actuator 6. The actuator 6 changes the current attitude of the pointed device 1 to bring it into closer correspondence with the desired orientation.

Since arbitrary disturbances and unwanted fluctuations can occur at various points in the system of the present invention, the system of the present invention must be able to reject or filter out these fluctuations and perform its task with the prescribed accuracy, while producing as faithful a representation of the desirable pointing direction as feasible. This function of the filtering and smoothing is achieved by the above mentioned pointing controller with different types of feedback approaches, namely:

(a) Angle position feedback, (b) Angular rate and acceleration feedback.

The target coordinate producer 8 includes an Infrared sensor (IR), RF (Radio Frequency) radar, Laser radar (LADAR), and CCD (Charge Couple Devices) camera, or a multisensor data fusion system. Multisensor data fusion is an evolving technology that is analogous to the cognitive process used by humans to integrate data from their senses (sights, sounds, smells, tastes, and touch) continuously and make inferences about the external world.

Figure 2:
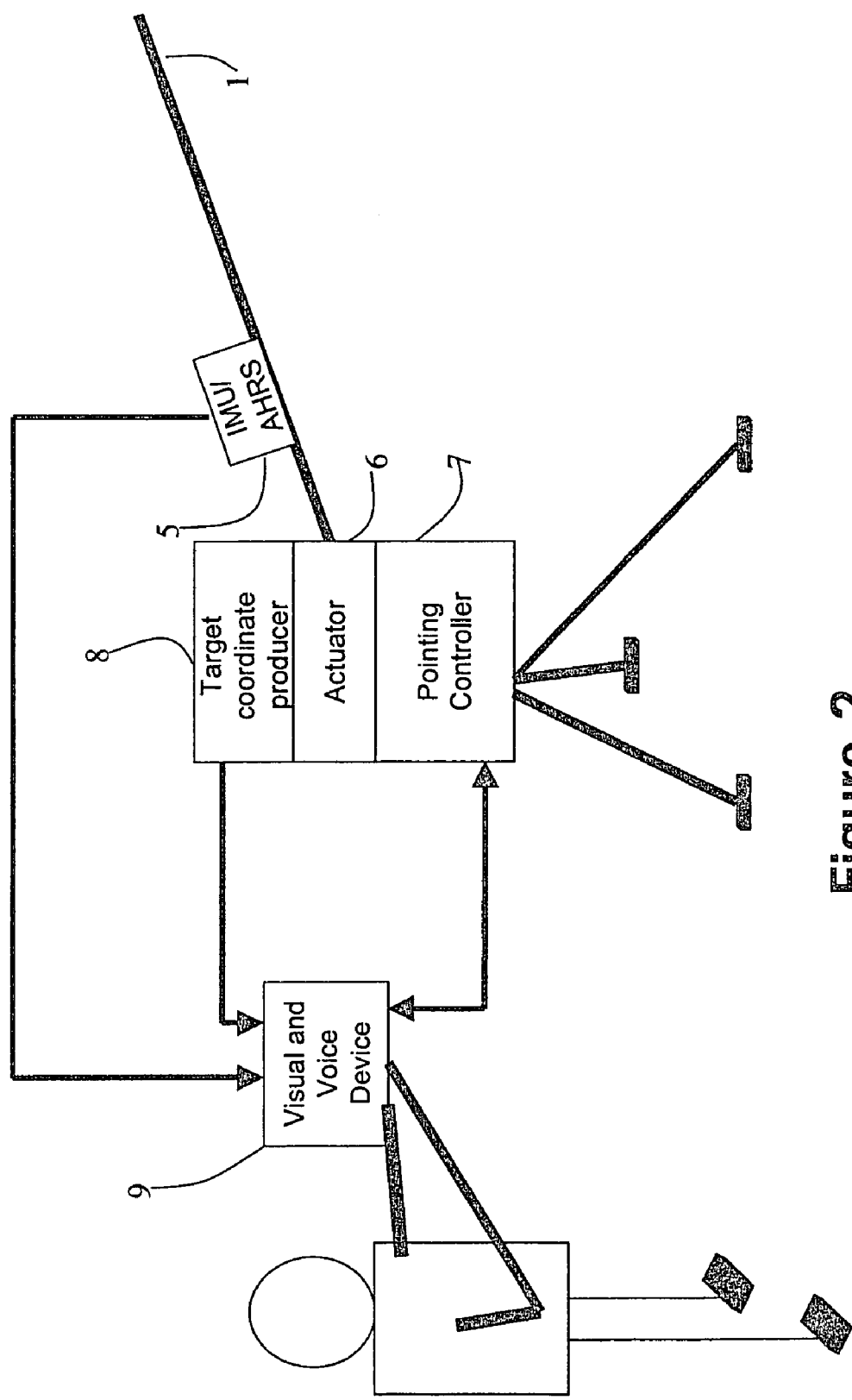
FIG. 2 is a block diagram illustrating the machine gun application according to the above preferred embodiment of the present invention.

In general, the benefit of employing multisensor data fusion system includes:

(1) Robust operational performance (2) Extended spatial coverage (3) Extended temporal coverage (4) Increased confidence (5) Improved ambiguity (6) Improved detection performance (7) Enhanced spatial resolution (8) Improved system operational reliability In the preferred gun turret smart machine gun application of the present invention, referring to FIG. 2, the user identifies the coordinates of a target by the use of the target coordinate producer 8, including a radar and laser rangefinder. The coordinates of a target are electronically relayed to the pointing controller 7 through the visual and voice device 9. The actuator 6, including a machine gunner, slews the gun barrel boresight toward the precise coordinates of the target so that it is ready to start laying down fire. The visual and voice device 9 shows the location of the target and the pointing procedure. After the user selects the target from the display, the target coordinates are automatically relayed to the pointing controller 7, as well as current attitude of the device 1 from the IMU/AHRS 5. The actuator 6 (the machine gunner) interacts with the pointing controller 7 to implement the fire control mission.

The gun turret smart machine gun application of the present invention is required to perform its missions in the presence of disturbances, parametric uncertainces and malfunctions, and to account for undesired vibrations. The system of the present invention integrates the techniques of signal/image processing, pattern classification, control system modeling, analysis and synthesis. The system of the present invention balances and optimizes tightly coupled signal processing and control strategies, algorithms and procedures.

Figure 3:
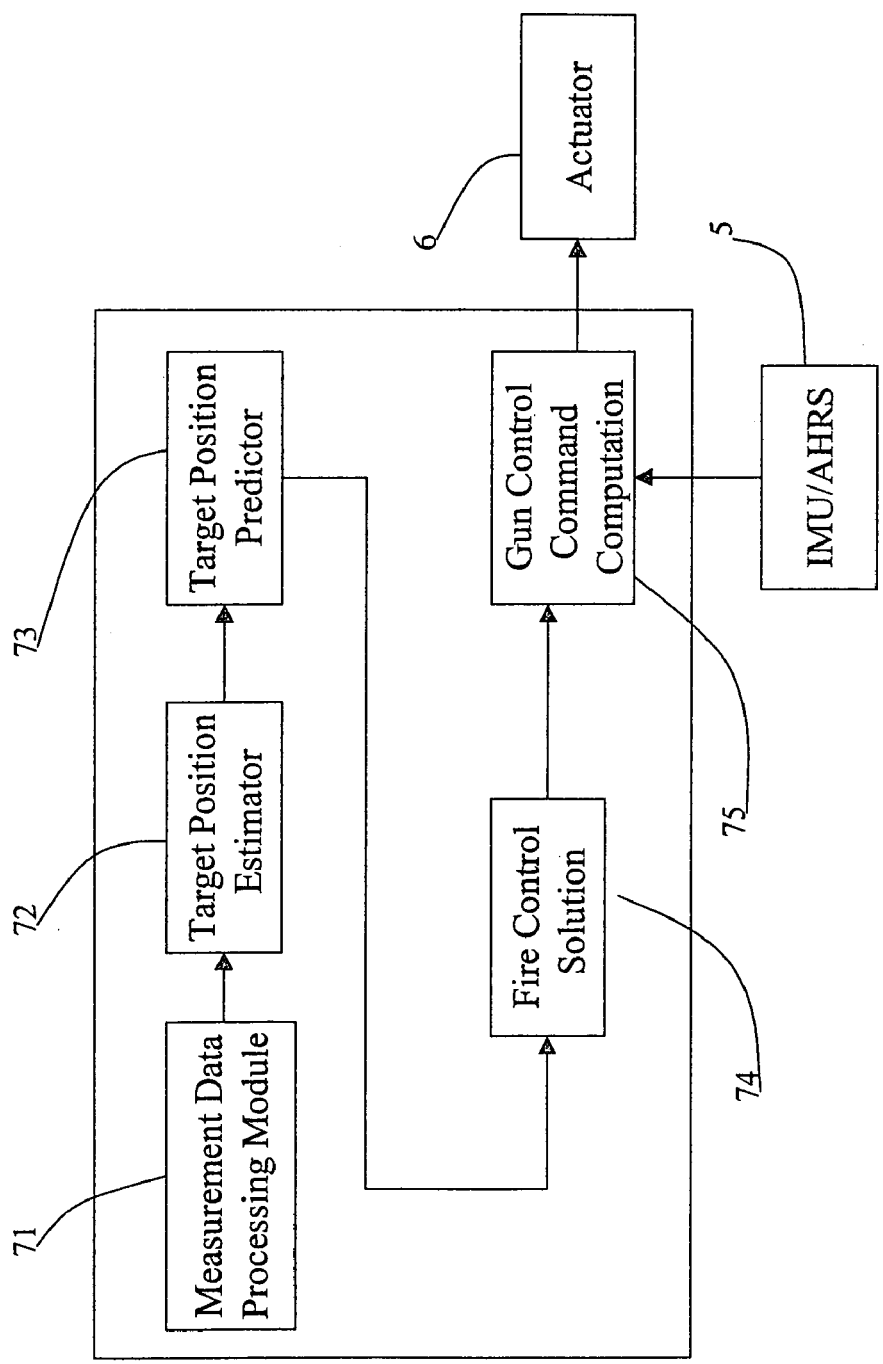
FIG. 3 is a block diagram illustrating the pointing controller in the machine gun application according to the above preferred embodiment of the present invention.

Referring to FIG. 3, the pointing controller 7 further comprises:

a measurement data processing module 71, for transforming the target positioning measurements, measured by the target coordinate producer 8 and corrupted with measurement noise, from the target coordinate producer body coordinates to local level coordinates;

a target position estimator 72, for yielding the current target state including target position estimation using the target positioning measurements;

a target position predictor 73, for predicting the future target trajectory and calculating the interception position and time of a projectile launched by the gun turret and the target;

a fire control solution module 74, for producing the gun turret azimuth and elevation required for launch of the projectile; and a device control command computation module 75, for producing control commands to the actuator 6 using the required gun turret azimuth and elevation and current attitude and attitude rate data of the gun turret 1 from the IMU/AHRS 5 to stabilize and implement the required gun turret azimuth and elevation with disturbance rejection.

Generally, radar measurements include the target range, range rate, azimuth, azimuth rate, elevation and elevation rate. The relationship between the target position and velocity, and the radar measurements can be expressed as:

$$r_m = \sqrt{x_T^2 + y_T^2 + z_T^2} + w_1$$

$$\theta_m = \tan^{-1}\left(\frac{-z_T}{\sqrt{x_T^2 + y_T^2}}\right) + w_2$$

$$\varphi_m = \tan^{-1}\left(\frac{y_T}{x_T}\right) + w_3$$

$$\dot{r}_m = \frac{\dot{x}_T x_T + \dot{y}_T y_T + \dot{z}_T z_T}{\sqrt{x_T^2 + y_T^2 + z_T^2}} + w_4$$

$$\dot{\theta}_m = \frac{z_T(\dot{x}_T x_T + \dot{y}_T y_T) - \dot{z}_T(x_T^2 + y_T^2)}{(x_T^2 + y_T^2 + z_T^2)\sqrt{x_T^2 + y_T^2}} + w_5$$

$$\dot{\varphi}_m = \frac{\dot{y}_T x_T - \dot{x}_T y_T}{x_T^2 + y_T^2} + w_6$$

where ($x_T$, $y_T$, $z_T$)=real target position;

($\dot{x}_T$, $\dot{y}_T$, $\dot{z}_T$)=real target velocity;

($r_m$, $\dot{r}_m$)=measured target line of sight (LOS) range and range rate;

($\theta_m$, $\dot{\theta}_m$)=measured target LOS elevation and elevation rate;

($\varphi_m$, $\dot{\varphi}_m$)=measured target LOS azimuth and azimuth rate;

The radar measurements are expressed in radar antenna coordinates. The target position estimator 72 is embodied as a Kalman filter 72. In order to simplify the software design of the Kalman filter 72, the radar measurements are transferred back into local level orthogonal coordinates. The measurement data processing module 71 maps nonlinearly the radar measurements presented in radar antenna coordinates into those presented in the local level orthogonal coordinates. The relationship between the input and output of the measurement data processing module 71 are:

$$x_{mT} = r_m \cos(\theta_m)\cos(\varphi_m)$$

$$y_{mT} = r_m \cos(\theta_m)\sin(\varphi_m)$$

$$z_{mT} = r_m \sin(\varphi_m)$$

$$\dot{x}_{mT} = \dot{r}_m \cos(\theta_m)\cos(\varphi_m) - r_m \sin(\theta_m)\cos(\varphi_m)\dot{\theta}_m - r_m \cos(\theta_m)\sin(\varphi_m)\dot{\varphi}_m$$

$$\dot{y}_{mT} = \dot{r}_m \cos(\theta_m)\sin(\varphi_m) - r_m \cos(\theta_m)\sin(\varphi_m)\dot{\theta}_m + r_m \cos(\theta_m)\cos(\varphi_m)\dot{\varphi}_m$$

$$\dot{z}_{mT} = -\dot{r}_m \sin\theta_m - r_m \cos(\theta_m)\dot{\theta}_m$$

where ($x_{mT}$, $y_{mT}$, $z_{mT}$)=transformed target position measurement;

($\dot{x}_{mT}$, $\dot{y}_{mT}$, $\dot{z}_{mT}$)=transformed target velocity;

For a successful engagement, the future target trajectory needs to be predicted accurately. Then the intercept position and time can be solved rapidly in terms of predicted target trajectory and the projectile flight dynamics. The inputs to the target position predictor 73 are the currently estimated target states, including target position and velocity, from the target position estimator 72, while the outputs the target position predictor 73 are the predicted intercept and intercept time.

Figure 4:
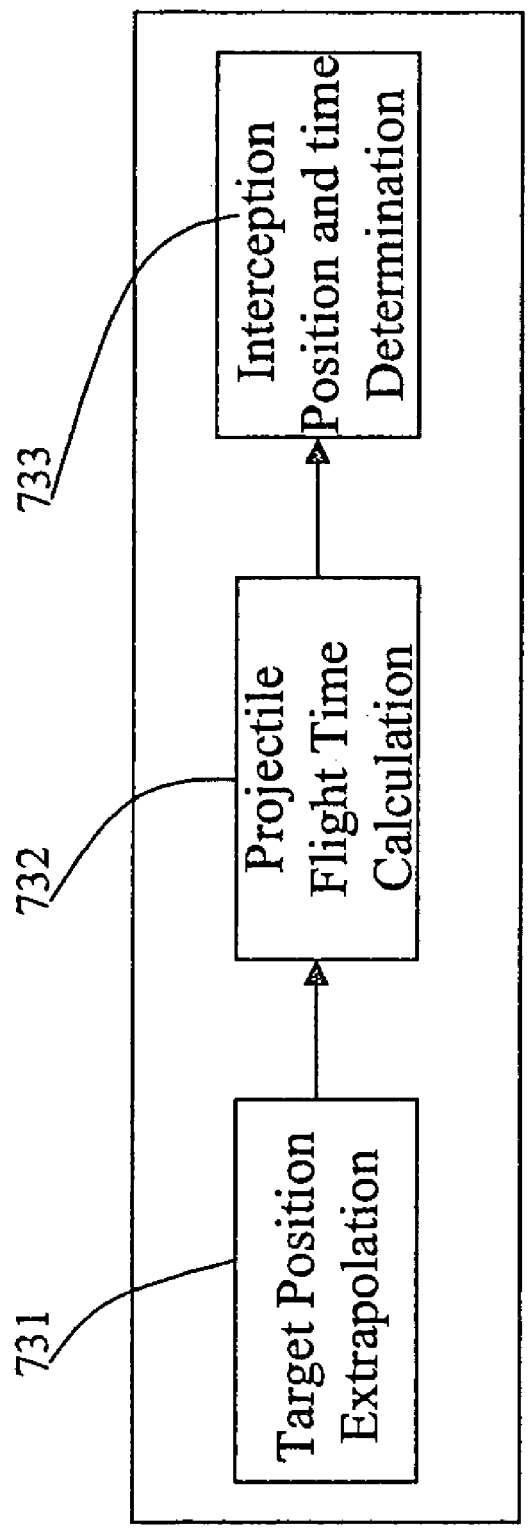
FIG. 4 is a block diagram illustrating the target position predictor according to the above preferred embodiment of the present invention.

Referring to FIG. 4, the target position predictor 73 further comprises a target position extrapolation module 731, a projectile flight time calculation 732, and an interception position and time determination 733.

The target position extrapolation module 731 is adapted for extrapolating the future trajectory of the projectile using the current target state including the target position estimation and system dynamic matrix:

$$X(t_{k+j}) = \Phi X(t_{k+j-1})$$

where $X(t_k)$ is the current target state estimating from the target position estimator 72. $X(t_{k+j})$ is predicted target state vector at time $t_{k+j} = t_k + \delta t \cdot j$, where $\delta t$ is chosen much less than the Kalman filtering step $\delta T = t_{k+1} - t_k$.

The projectile flight time calculation module 732 is adapted for computing the time of the projectile to fly from the gun turret to the interception position. As a preliminary design of the projectile flight time calculation module 732, the projectile flight time is approximately calculated by the LOS distance divided by a constant projectile speed.

The interception position and time determination module 733 is adapted for computing the interception position and time using the predicted future projectile trajectory and projectile flight time. Once the predicted target trajectory is determined, the time $t_1$ for the projectile to fly from the gun turret to each point of the predicted target trajectory and the time $t_2$ for the target to fly to the point can be calculated. Then the interception position can be determined, since for the interception point, the time $t_1$ should be equal to the time $t_2$.

The fire control solution module 74 gives the required gun turret azimuth and elevation by means of the given interception time and position from the target position predictor 72. Once the interception position is known, the gun tip elevation and azimuth can be accurately determined by using the fire control solution algorithms. The desired device tip azimuth $\varphi_{gun}^d$ and elevation $\theta_{gun}^d$ are calculated by $$\varphi_{gun}^d = \tan^{-1}\left(\frac{y_{TP}}{x_{TP}}\right)$$

-continued $$\theta_{gun}^d = \tan^{-1}\left(\frac{-z_{Tp}}{\sqrt{x_{Tp}^2 + y_{Tp}^2}}\right)$$

where $(x_{mT}, y_{mT}, z_{mT})$=the predicted interception position.

The device control command computation module 75 computes the platform rotation commands to the actuator 6 using the desired device tip azimuth and the elevation from the fire control solution module and the current attitude and attitude rate data from the IMU/AHRS 5 to place the gun tip to the desired position and stabilize the gun tip at the desired position with any disturbance rejection.

The device control command computation module 75 is a digital controller and definitely essential to isolate the gun turret from vibrations while maintaining precision stabilization and pointing performance.

As a preferred embodiment of the visual and voice device 9, the visual and voice device 9 is designed to display the target of the field of view of the gun turret motion, the projectile and target flight trajectories during the interception process.

Referring to FIGS. 1 to 4, the automatic stabilization and pointing control method according to the above preferred embodiment of the present invention comprises the steps of:

(1) identifying a desired pointing direction of a device by providing coordinates of a target by a means, including a target coordinate producer 8;

(2) determining a current attitude measurement of the device by a means, including an inertial measurement unit;

(3) computing platform rotation commands of the device using the desired pointing direction of the device and the current attitude measurements of the device by a means, including a pointing controller 7;

(4) rotating the device to the desired pointing direction by a means, including an actuator 6.

(5) visualizing the targets and desired pointing direction and current direction of the device; and (6) producing a voice representing the pointing procedure.

According to the preferred embodiment of the present invention, the step (3) further comprises the steps of, 3.1 transforming the target positioning measurements, measured by the target coordinate producer 8 and corrupted with measurement noise, from the target coordinate producer body coordinates to local level coordinates;

3.2 yielding the current target state including target position estimation using target positioning measurements measured by the target coordinate producer 8;

3.3 predicting the future target trajectory and calculating interception position and time of a projectile launched by the gun turret and the target;

3.4 producing gun turret azimuth and elevation required for launch of the projectile; and 3.5 producing control commands to the actuator using the gun turret azimuth and elevation and the current attitude and attitude rate data of the gun turret from the IMU/AHRS to stabilize and implement the gun turret azimuth and elevation with disturbance rejection.

Also, the step (3.3) further comprises the steps of:

3.3.1 extrapolating the future trajectory of the projectile using the current target state, including the current target position estimation and system dynamic matrix;

3.3.2 computing time of the projectile to fly from the gun turret to interception position; and 3.3.3 computing interception position and time using the predicted future projectile trajectory and projectile flight time.

The preferred IMU/AHRS 5 is a micro MEMS IMU in which a position and attitude processor is built in. The IMU/AHRS 5 is disclosed as follows.

Generally, an inertial measurement unit (IMU) is employed to determine the motion of a carrier. In principle, an inertial measurement unit relies on three orthogonally mounted inertial angular rate producers and three orthogonally mounted acceleration producers to obtain three-axis angular rate and acceleration measurement signals. The three orthogonally mounted inertial angular rate producers and three orthogonally mounted acceleration producers with additional supporting mechanical structure and electronic devices are conventionally called an Inertial Measurement Unit (IMU). The conventional IMUs may be cataloged into Platform IMU and Strapdown IMU.

In the platform IMU, angular rate producers and acceleration producers are installed on a stabilized platform. Attitude measurements can be directly picked off from the platform structure. But attitude rate measurements can not be directly obtained from the platform. Moreover, there are highly accurate feedback control loops associated with the platform.

Compared with the platform IMU, in the strapdown IMU, angular rate producers and acceleration producers are directly strapped down with the carrier and move with the carrier. The output signals of the strapdown rate producers and acceleration producers are expressed in the carrier body frame. The attitude and attitude rate measurements can be obtained by means of a series of computations.

A conventional IMU uses a variety of inertial angular rate producers and acceleration producers. Conventional inertial angular rate producers include iron spinning wheel gyros and optical gyros, such as Floated Integrating Gyros (FIG), Dynamically Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), etc. Conventional acceleration producers include Pulsed Integrating Pendulous Accelerometer (PIPA), Pendulous Integrating Gyro Accelerometer (PIGA), etc.

The processing method, mechanical supporting structures, and electronic circuitry of conventional IMUs vary with the type of gyros and accelerometers employed in the IMUs. Because conventional gyros and accelerometers have a large size, high power consumption, and moving mass, complex feedback control loops are required to obtain stable motion measurements. For example, dynamic-tuned gyros and accelerometers need force-rebalance loops to create a moving mass idle position. There are often pulse modulation force-rebalance circuits associated with dynamic-tuned gyros and accelerometer based IMUs. Therefore, conventional IMUs commonly have the following features:

1. High cost,
2. Large bulk (volume, mass, large weight),
3. High power consumption,
4. Limited lifetime, and
5. Long turn-on time.

These present deficiencies of conventional IMUs prohibit them from use in the emerging commercial applications, such as phased array antennas for mobile communications, automotive navigation, and handheld equipment.

New horizons are opening up for inertial sensor device technologies. MEMS (MicroElectronicMechanicalSystem) inertial sensors offer tremendous cost, size, and reliability improvements for guidance, navigation, and control systems, compared with conventional inertial sensors.

MEMS, or, as stated more simply, micromachines, are considered as the next logical step in the silicon revolution. It is believed that this coming step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

Prolific MEMS angular rate sensor approaches have been developed to meet the need for inexpensive yet reliable angular rate sensors in fields ranging from automotive to consumer electronics. Single input axis MEMS angular rate sensors are based on either translational resonance, such as tuning forks, or structural mode resonance, such as vibrating rings. Moreover, dual input axis MEMS angular rate sensors may be based on angular resonance of a rotating rigid rotor suspended by torsional springs. Current MEMS angular rate sensors are primarily based on an electronically-driven tuning fork method.

More accurate MEMS accelerometers are the force rebalance type that use closed-loop capacitive sensing and electrostatic forcing. Draper's micromechnical accelerometer is a typical example, where the accelerometer is a monolithic silicon structure consisting of a torsional pendulum with capacitive readout and electrostatic torquer. Analog Device's MEMS accelerometer has an integrated polysilicon capacitive structure fabricated with on-chip BiMOS process to include a precision voltage reference, local oscillators, amplifiers, demodulators, force rebalance loop and self-test functions.

Although the MEMS angular rate sensors and MEMS accelerometers are available commercially and have achieved micro chip-size and low power consumption, however, there is not yet available high performance, small size, and low power consumption IMUs.

Currently, MEMS exploits the existing microelectronics infrastructure to create complex machines with micron feature sizes. These machines can have many functions, including sensing, communication, and actuation. Extensive applications for these devices exist in a wide variety of commercial systems.

The difficulties for building a micro IMU is the achievement of the following hallmark using existing low cost and low accuracy angular rate sensors and accelerometers:

1. Low cost,
2. Micro size
3. Lightweight
4. Low power consumption
5. No wear/extended lifetime
6. Instant turn-on
7. Large dynamic range
8. High sensitivity
9. High stability
10. High accuracy To achieve the high degree of performance mentioned above, a number of problems need to be addressed:

(1) Micro-size angular rate sensors and accelerometers need to be obtained. Currently, the best candidate angular rate sensor and accelerometer to meet the micro size are MEMS angular rate sensors and MEMS accelerometers.

(2) Associated mechanical structures need to be designed.

(3) Associated electronic circuitry needs to be designed.

(4) Associated thermal requirements design need to be met to compensate the MEMS sensor's thermal effects.

(5) The size and power of the associated electronic circuitry needs to be reduced.

The micro inertial measurement unit of the present invention is preferred to employ with the angular rate producer, such as MEMS angular rate device array or gyro array, that provides three-axis angular rate measurement signals of a carrier, and the acceleration producer, such as MEMS acceleration device array or accelerometer array, that provides three-axis acceleration measurement signals of the carrier, wherein the motion measurements of the carrier, such as attitude and heading angles, are achieved by means of processing procedures of the three-axis angular rate measurement signals from the angular rate producer and the three-axis acceleration measurement signals from the acceleration producer.

In the present invention, output signals of the angular rate producer and acceleration producer are processed to obtain digital highly accurate angular rate increment and velocity increment measurements of the carrier, and are further processed to obtain highly accurate position, velocity, attitude and heading measurements of the carrier under dynamic environments.

Figure 5:
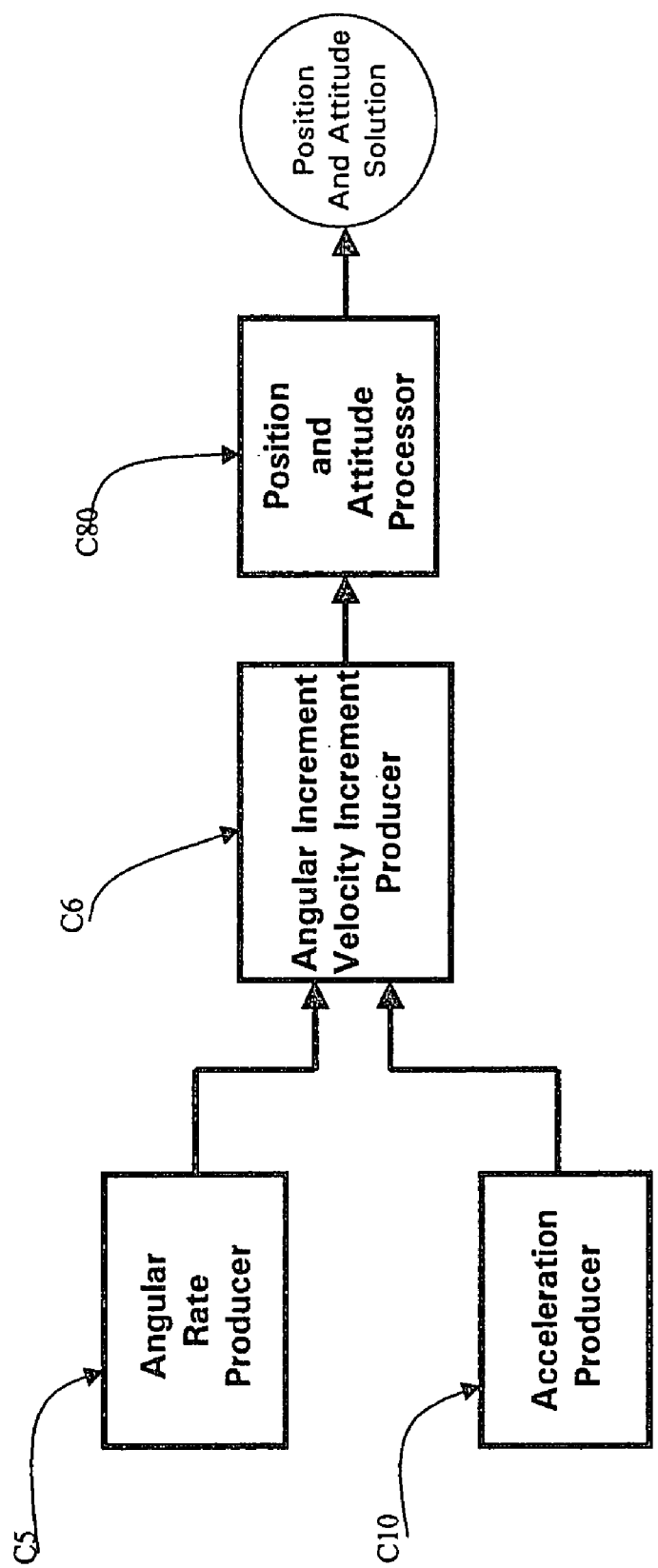
FIG. 5 is a block diagram illustrating the processing module for a micro inertial measurement unit according to a preferred embodiment of the present invention.

Referring to FIG. 5, the micro inertial measurement unit of the present invention comprises an angular rate producer c5 for producing three-axis (X axis, Y axis and Z axis) angular rate signals; an acceleration producer c10 for producing three-axis (X-axis, Y axis and Z axis) acceleration signals; and an angular increment and velocity increment producer c6 for converting the three-axis angular rate signals into digital angular increments and for converting the input three-axis acceleration signals into digital velocity increments.

Moreover, a position and attitude processor c80 is adapted to further connect with the micro IMU of the present invention to compute position, attitude and heading angle measurements using the three-axis digital angular increments and three-axis velocity increments to provide a user with a rich motion measurement to meet diverse needs.

The position, attitude and heading processor c80 further comprises two optional running modules:

(1) Attitude and Heading Module c81, producing attitude and heading angle only; and (2) Position, Velocity, Attitude, and Heading Module c82, producing position, velocity, and attitude angles.

Referring to FIG. 5, the digital three-axis angular increment voltage values or real values and three-axis digital velocity increment voltage values or real values are produced and outputted from the angular increment and velocity increment producer c6.

Figure 6:
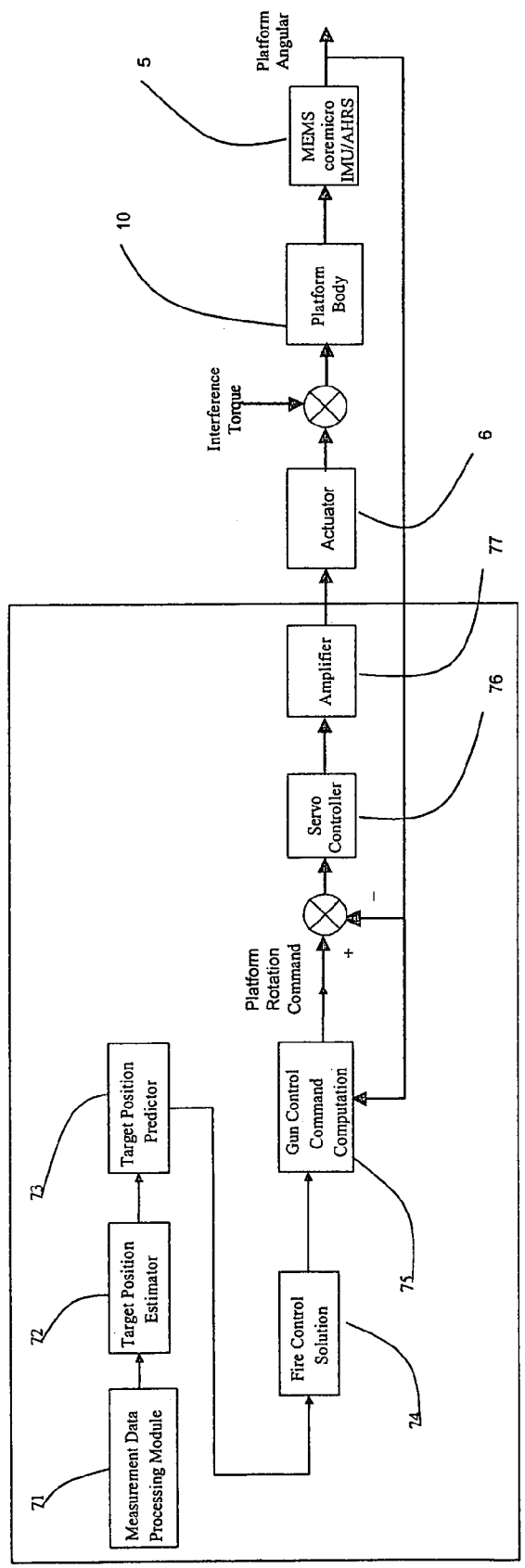
FIG. 6 depicts the operational principle of the Method and System for Automatic Stabilization and Pointing Control of a Device.

FIG. 6 is another embodiment of the detailed block diagram of System for Automatic Stabilization and Pointing Control of a Device in which the pointed device 1 in FIG. 1, 2, is specifically referred to as the platform 1 or platform body 1 or gimbaled platform. With the application of the MEMS IMU, the design of the servo controller 76 is a key technical issue in this invention. The servo controller 76 signals are amplified by an amplifier 77. The stability and anti-interference performance of the automatic stabilization and pointing control of a device is mostly determined by the servo loop design. The characteristics of the MEMS gyro also impact the control loop design.

The stability and anti-interference performance of the pointing stabilization mechanism is mostly determined by the servo loop design. It is often difficult to determine the controller parameters that can satisfy different application environments. The system model has platform rates or platform angles as outputs, and three inputs, platform rotation command, interference torque, and gyro drift. The performance of the servo system can be described by the response of the platform 1 to the system inputs.

The platform 1 of the automatic stabilization and pointing control of a device can rotate with respect to inertial space if there is a command input. In the automatic stabilization and pointing control of a device, the command function can be used to reset or initialize the attitude system pointing direction. Because gyro drift exists, the platform of the attitude system needs to be reset periodically. In this invent, however, the major objective of the servo loop design is to eliminate the effect of short-term interference torque acting on the platform. The interference torque is induced by attitude changes of the vehicle, the elastic deformation of the platform and gimbals, and vehicle vibration. The frequency range of interest is from about one third of a hertz to 10 Khz. The design of the servo controller C(s) is the key issue in this task. After the hardware of the servo system is implemented, the performance of the servo system is mostly determined by the servo controller design. But the following factors make it difficult to design a servo controller that can satisfy requirements under different application conditions:

(A) The coupling between the two servo control channels of the pointing stabilization mechanism. In the servo controller design we can ignore it, but in practice the coupling can affect the system performance.

(B) The existence of non-linearity. The platform-gimbals system 1 is actually a nonlinear system that can be described by two interacting rigid bodies. The dry friction between the platform and gimbals is also nonlinear.

(C) The vibration models of the vehicle, gamble, and mirror are often unknown. Since in the gimbaled pointing stabilization mechanism the vibration induced interference torque to the platform is of special concern, the vibration model is needed in the servo controller design.

Figure 7:
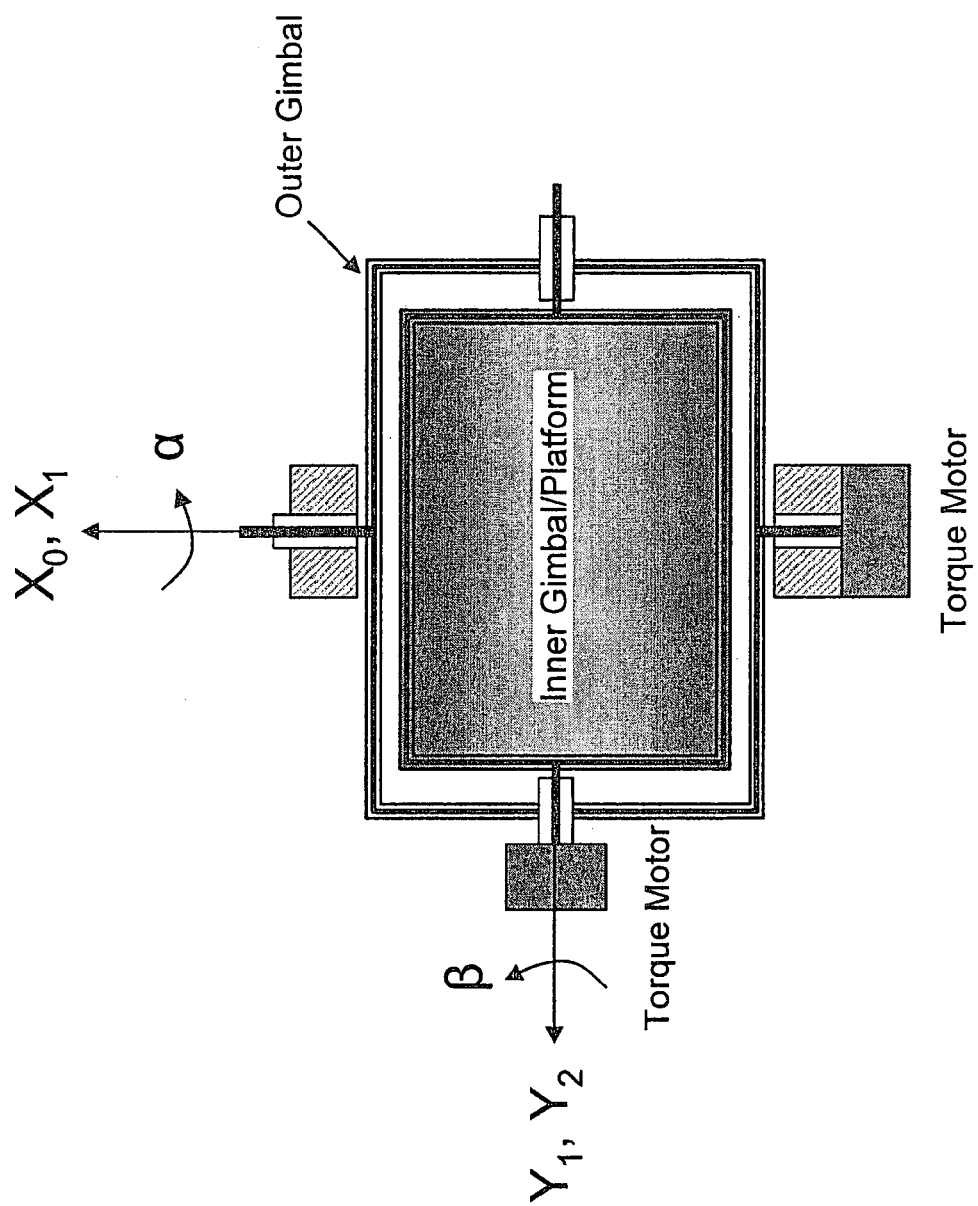
FIG. 7 depicts Gimbaled Platform Model and Frame Definition.

FIG. 7 is depicts a simplified mechanical system model of the gimbaled platform 1.

Figure 8:
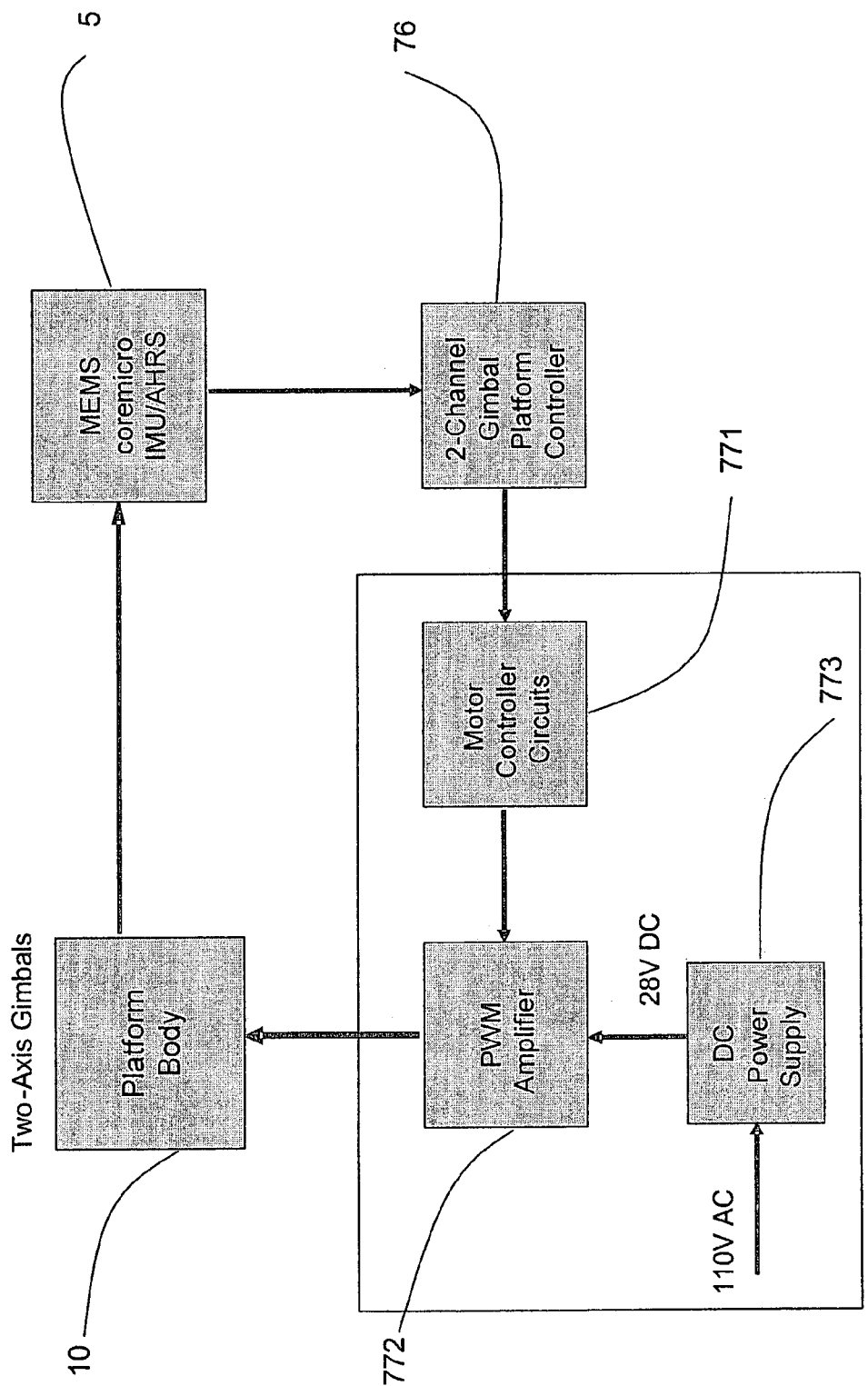
FIG. 8 depicts System Configuration of the Experimental Inertial Pointing and Stabilization Mechanism.

FIG. 8 depicts the system configuration of the experimental automatic stabilization and pointing control of a device.

Referring to FIGS. 1 to 8, the automatic stabilization and pointing control method according to the above preferred embodiment of the present invention comprises the steps of:

(1) identifying a desired pointing direction of a device by providing coordinates of a target by a means, including a target coordinate producer 8;

(2) determining a current attitude measurement of the device by a means, including an inertial measurement unit;

(3) computing platform rotation commands of the device using the desired pointing direction of the device and the current attitude measurements of the device 5 by a means, including measurement data processing module 71, target position estimator 72, target position predictor 73, fire control solution module 74, gun control command computation module 75;

(4) combining the computed platform rotation commands with the feedback signals from the coremicro IMU 5;

(5) computing the automatic stabilization and pointing control signal by with the servo controller 76;

(7) amplifying the servo controller 76 signals by an amplifier 77;

(8) sending the amplified the servo controller 76 signals to the actuator 6;

(9) the actuator 6—torque motors—converts the electric signals to torques and the torque exerted on the platform body 10 to eliminate interference to the platform body 10;

(10) sensing the motion of the platform body 10 by coremicro IMU 5 and feedback the sensor signal to the servo controller 76;

(11) rotating the device to the desired pointing direction by a means, including an actuator 6;

(12) visualizing the targets and desired pointing direction and current direction of the device; and

(13) producing a voice representing the pointing procedure.

Referring to FIGS. 7, the pointed device is usually a gambled two-degree-of-freedom platform body 10. Now we analyze the motion model of the gimbaled platform. A simplified mechanical system model of the gimbaled platform is depicted. It consists of 3 objects: a base that is stationary or fixed to a carrier, an outer gimbal, and the inner gimbal or platform. To describe the motion and establish a mathematical model for the gimbaled platform, we define 3 systems of coordinates (frames):

(I) Frame 0, $OX_0Y_0Z_0$ - - - fixed to the base.

(II) Frame 1, $OX_1Y_1Z_1$ - - - fixed to the outer gimbal.

(III) Frame 2 or B, $OX_2Y_2Z_2/OX_bY_bZ_b$ - - - fixed to the inner gimbal or platform.

FIG. 7 depicts the directions definition of the above 3 frames. The angular position of the platform can be described by the relative position of the frame B/2 with respective to the frame 0, which is determined by two gimbal angles along the two gimbal axes, $\alpha$ and $\beta$.

Using a directional cosine matrix (DCM) to describe the relative angular position, the frame 1 angular position with respective to frame 0 is expressed as:

$$C_0^1 = \begin{bmatrix} 1 & 0 & 0 \\ 0 & \cos\alpha & \sin\alpha \\ 0 & -\sin\alpha & \cos\alpha \end{bmatrix}$$

Similarly, the frame 2/B angular position with respective to frame 1 is expressed as:

$$C_1^2 = \begin{bmatrix} \cos\beta & 0 & -\sin\beta \\ 0 & 1 & 0 \\ \sin\beta & 0 & \cos\beta \end{bmatrix}$$

The angular velocity of the gimbaled platform is determined by the vector equation:

$$\omega = \dot{\alpha} + \dot{\beta}$$

Expressing it in component form and in the frame 2/B, we obtain:

$$\omega^b = C_1^2 \begin{bmatrix} \dot{\alpha} \\ 0 \\ 0 \end{bmatrix} + \begin{bmatrix} 0 \\ \dot{\beta} \\ 0 \end{bmatrix}$$

Or:

$$\omega_x = \dot{\alpha} \cos\beta$$

$$\omega_y = \dot{\beta}$$

$$\omega_z = -\dot{\alpha}\sin\beta$$

The external torques applied on the gimbaled platform 1 are transferred from the outer gimbal. They can be expressed in the 3 axes directions of the frame 1:

(i) Torque from motor in the $OX_1$ direction, $M_\alpha$.
(ii) Torque from motor in the $OY_1$ direction, $M_\beta$.
(iii) Torque from the base in the $OZ_1$ direction, $M_z$.

In addition, there are also external torques caused by friction and elastic properties of the gimbals. We consider them as external interference torques in the analysis and simulation.

The external torques transferred to the frame 2/B, the gimbaled platform 1, and expressed in the frame 2/B are:

$$M^b = C_1^2 \begin{bmatrix} M_\alpha \\ M_\beta \\ M_z \end{bmatrix}$$

Or in components:

$$M_x = M_\alpha \cos\beta - M_z \sin\beta$$

$$M_y = M_\beta$$

$$M_z = M_\alpha \sin\beta + M_z \cos\beta$$

At first, we consider the gimbaled platform 1 as a rigid body and the dynamic motion can be described by the so-called Euler Equations:

$$\dot{H} = [I^b]\dot{\omega} + \omega \times H = M^b$$

where H is the angular relative momentum of the gimbaled platform 1 and $$H = [I^b]\omega$$

where $[I^b]$ is the inertia matrix of the gimbaled platform 1 with respect to frame 2/B.

The Euler Equations in component form is:

$$I_x \dot{\omega}_x + (I_z - I_y)\omega_z \omega_y = M_x$$

$$I_y \dot{\omega}_y + (I_x - I_z)\omega_x \omega_z = M_y$$

$$I_z \dot{\omega}_z + (I_y - I_x)\omega_y \omega_x = M_z$$

where $I_x, I_y, I_z$, are the moments of inertia of the gimbaled platform 1 with respect to the axes of the frame 2/B.

Combining the angular velocity equations and torque equations into the Euler Equations, we can obtain the dynamic mathematical model of the gimbaled platform 1:

$$I_x(\ddot{\alpha}\cos\beta - \dot{\alpha}\dot{\beta}\sin\beta) + (I_z - I_y)\dot{\alpha}\dot{\beta}\sin\beta = M_\alpha\cos\beta - M_z\sin\beta$$

$$I_y\ddot{\beta} + (I_x - I_z)\dot{\alpha}^2 \cos\beta\sin\beta = M_\beta$$

$$I_z(\ddot{\alpha}\sin\beta + \dot{\alpha}\dot{\beta}\cos\beta) + (I_y - I_x)\dot{\alpha}\dot{\beta}\cos\beta = M_\alpha\sin\beta + M_z\cos\beta$$

In the above 3 equations, $M_\alpha$, $M_\beta$ are controlling torques from the motors, while $M_z$ is a reaction torque from the base. Therefore, the first 2 equations are useful for control system analysis design and the third equation is a torque relation for the gimbaled system.

Referring to FIG. 6, the actuator 6 is usually a set of DC motors. A generic DC motor model can be expressed as:

$$V_{in} = iR + L\frac{di}{dt} + K_b\omega$$

$$M = K_t i$$

where:
$V_{in}$ - - - motor input voltage;
i - - - motor armature coil current;
R - - - motor armature coil resistance;
L - - - motor armature coil inductance;
$K_b$ - - - motor back electromotive force (EMF) constant;
ω - - - motor shaft angular velocity;
M. - - - motor shaft torque;
$K_t$ - - - motor torque constant.

Applying this model to the two motors to control the motion of the gimbaled platform 1 in the two axes, $OX_1$ and $OY_1$, respectively, we obtain two sets of motor equations:

$$V_{inx} = i_x R + L\frac{di_x}{dt} + K_b \dot{\alpha}$$

$$M_\alpha = K_t i_x$$

$$V_{iny} = i_y R + L\frac{di_y}{dt} + K_b \dot{\beta}$$

$$M_\beta = K_t i_y$$

Combined together, the dynamic model of the motor-gimbaled platform system is expressed as follows:

$$I_x(\ddot{\alpha}\cos\beta - \dot{\alpha}\dot{\beta}\sin\beta) + (I_z - I_y)\dot{\alpha}\dot{\beta}\sin\beta = K_t i_x \cos\beta - M_z \sin\beta$$

$$i_x R + L\frac{di_x}{dt} K_b \dot{\alpha} = V_{inx}$$

$$I_y \ddot{\beta} + (I_x - I_z)\dot{\alpha}^2 \cos\beta\sin\beta = K_t i_y$$

$$i_y R + L\frac{di_y}{dt} + K_b \dot{\beta} = V_{iny}$$

The inputs of the system are $V_{inx}$, $V_{iny}$, and outputs are α and β.

Two direct drive, brushless dc motors are used in the two-axis gimbals system for the experimental inertial pointing and stabilization mechanism. We need to have a motor controller circuit module to control the two direct drive, brushless dc motors. When making a DC brushless motor controller choice, there are several issues that have to be addressed so that the proper device is selected for the system.

In the two-axis gimbals system, the direction of the motor needs to be changed. This has to be taken into account in the controller selection. And the torque needs to be controlled, so a controller with a current loop control needs to be specified. Also, if the two-axis gimbals system control calls for a high bandwidth servo control loop, a full four-quadrant controller must be chosen.

There are four possible modes or quadrants of operation using a DC motor, brushless or otherwise. In an X-Y plot of speed versus torque, Quadrant I is forward speed and forward torque. The torque is rotating the motor in the forward direction. Conversely, Quadrant III is reverse speed and reverse torque. Now the motor is rotating in the reverse direction, spinning backwards with the reverse torque. Quadrant II is where the motor is spinning in the forward direction, but torque is being applied in reverse. Torque is being used to "brake" the motor, and the motor is now generating power as a result. Finally, Quadrant IV is exactly the opposite. The motor is spinning in the reverse direction, but the torque is being applied in the forward direction. Again, torque is being applied to attempt to slow the motor and change its direction to forward again. Once again, the motor is generating power.

A one-quadrant motor controller will drive the motor in one direction only. An example of this would be a small fan or blower, such as the brushless fans used on some PC power supplies. A small pump that only needs to run in one direction can also use such a controller. A two-quadrant controller has the capability of reversing the direction of the motor. If the pump needs to be backed up, this would be the controller to use. A four-quadrant controller can control the motor torque both in the forward and the reverse direction regardless of the direction of the motor. A servo control system needs just this kind of control.

In order to have complete control of torque, the feedback loop has to allow the amplifier to maintain control of the torque at all times. A missile fin actuator or antenna pointing system needs to have complete control of motor torque at all times in order to satisfy the system requirements. Examining what happens during the PWM sequence will reveal the difference in controllers. current control of a brushless motor by sensing the current through the motor, thereby controlling the torque output of the motor. In a DC motor, torque is proportional to current. Enough torque produces speed, and the controller is used as the inner loop of a servo speed control system. By controlling torque directly instead of speed, better control of a motor in a servo system is realized. In other controllers, the loop control is lost as the controller passes through zero torque. This is not acceptable in most servo control systems. This discontinuity will disrupt the control system in many cases.

To stabilize the gimbaled platform 1 with respect to the stationary base or the inertial space, a coremicro IMU is mounted on the platform to sense its motion. If, on the platform, the IMU's sensing axes are identical to those of the frame 2/B, respectively, the measurement model of the IMU can be expressed as:

$$\omega_{out} = \omega_{bi}^b + \varepsilon = C_1^2 \begin{bmatrix} \dot{\alpha} \\ 0 \\ 0 \end{bmatrix} + \begin{bmatrix} 0 \\ \dot{\beta} \\ 0 \end{bmatrix} + C_0^2 \omega_{0i}^0 + \varepsilon$$

where $\varepsilon$ is the total gyro drift, and $\omega_{0i}^0$ is the base angular velocity with respect to inertial space.

Referring to FIG. 8, the system configuration of the experimental automatic stabilization and pointing control system of a device. The experimental automatic stabilization and pointing control system consists of an AGNC coremicro AHRS/INS/GPS Integration Unit 5, a COTS 2-axis gimbals system 10, a 2-channel platform controller 76 and amplifier 77. Referring to FIG. 8 the amplifier 77 further comprises:

- a motor controller circuits module 771 producing a suite of PWM control pulses (usually 4 channels) according to the data or signals from the platform controller 76. The produced signals control the PWM amplifier 772;
- a PWM amplifier 772 to drive the gimbal motor in different operation modes, such as forward, backward, brake, lock, etc. The PWM amplifier 772 consists of a set of high speed high power semi-conductor switches, such as GTR, VMOS, or IGBT. Under the control of pulses from the motor controller circuits 771, the PWM amplifier 772 generates PWM voltages and currents to the motors; and
- a DC power supply 773. The electric power is from the DC power supply 773, which rectifies the AC to produce a 28V DC power.

The coremicro AHRS/INS/GPS Integration Unit 5 is embedded in the 2-axis gimbals platform 1 to measure the platform motion with respect to inertial space. The computation capability of the coremicro AHRS/INS/GPS Integration Unit 5 is also used to implement the 2-channel gimbals platform controller 76.

The two-axis gimbals system selected for the experimental inertial pointing and stabilization mechanism is a COTS gimbals meeting challenging performance demands for pointing various payloads at high degrees of accuracy and in extreme environments. These gimbals accommodate diverse payloads, including mirror flats, laser transponders, optical telescopes, and science instrument packages This two-axis gimbals system can be designed to meet specific needs. It combines direct drive, brushless dc motors, precision bearings, angular position transducers, and signal transfer devices with a lightweight, stiff structure. The gimbals system can be modified to embed the coremicro AHRS/INS/GPS Integration Unit with its structure.

The gimbals system utilizes a vacuum lubrication process to protect contacting surfaces. Wet or dry vacuum lubrication process offers very low outgassing lubrication options chosen based on life, temperature, contamination, or radiation requirements. This gimbals system and specialized lubrication have been integrated into some of the most precise pointing systems for ground, aircraft, and space-based applications.

The gimbals can be operated in either the position mode or the stabilization mode.

In the position mode, the gimbal control loop holds the gimbal in a given position with respect to the vehicle. An angle-measuring resolver is used as the loop feedback element.

In the stabilization mode, the gimbal control loop holds the gimbal in a given orientation in inertial space. This is realized because of the use of the coremicro AHRS/INS/GPS Integration Unit.

Pulse width modulation, or PWM is the method by which all class D amplifiers operate. By turning the supply voltage on and off at a high rate to a load and letting the characteristics of the load smooth out the current spikes, a much more efficient means of varying the power to the load is achieved. A switch is placed between one end of a DC motor and the supply and another switch between the other end of the motor and the return to the supply. Modulating the on-off duty cycle of one or both of the switches results in the proportional control of power to the motor, in one direction only. This is how one quadrant operation is achieved.

Adding a second pair of switches to the first pair, basically making two totem pole half bridges, is how a two-quadrant controller is constructed. Modulating one or both of the second pair of switches will result in controlling the motor in the opposite direction. This is operation in quadrant three.

The construction of a four-quadrant controller is exactly the same as the two-quadrant controller. The difference is in the modulation of the four switches. By modulating the opposite pairs of switches together in a complementary fashion, there is modulation control occurring at all times. In the two-quadrant case, as the motor either stops or changes direction, the modulation decreases to zero and starts backing up the opposite way. The control loop is out of the control influence during the time the modulation is stopped.

With a four-quadrant controller, modulation is occurring at a 50 percent duty cycle when the motor is not turning. The controller maintains control as the motor speed passes through zero. The net result is tighter control without any discontinuity at zero, and the bandwidth capability of the control system is doubled because, in effect, double the supply voltage is being utilized at all times.

Using this concept in a three-phase brushless DC motor controller, another half bridge is added. The pairs of half bridges are controlled by the Hall sensors, as they electrically commutate the motor with the three half bridges. At any given time, only two of the half bridges are being used, but they are modulated exactly as previously discussed.

The selected three-phase brushless DC motor controller is a full four-quadrant DC brushless motor control "torque amplifier." It is designed to provide closed loop The coremicro AHRS/INS/GPS Integration Unit is used as the loop feedback element in the stabilization mode. In either mode, the gimbal controller sends a torque command signal to the motor current loop closed by the motor controller.

What is claimed is:

1. An automatic stabilization and positioning control system for a device, comprising:
    an attitude producer determining current attitude and attitude rate measurements of said device;
    a target coordinate producer measuring a desired pointing direction of said device by capturing and tracking a target, wherein said target coordinate producer is adapted for capturing and tracking said target to measure said desired pointing direction of said pointed device;
    an actuator rotating said device to said desired pointing direction, wherein said actuator changes said current attitude of a pointed device to bring said pointed device into closer correspondence with a desired orientation;
    a pointing controller computing platform rotation commands to said actuator using said desired pointing direction of said device and said current attitude measurement of said device to rotate said device, wherein said pointing controller determines platform commands to said actuator by using errors between said desired pointing direction and said current direction of said pointed device; and
    a visual and voice device for providing an operator with audio and visual signals including displaying said desired pointing direction and current attitude of said device, target trajectory, and producing a voice representing a pointing procedure.

2. The system, as recited in claim 1, wherein said target coordinate producer comprises an Infrared sensor (IR), Radio frequency radar (RE), Laser radar (LADAR), and CCD (Charge couple devices) camera.

3. The system, as recited in claim 2, wherein said pointing controller comprises a measurement data processing module transforming target positioning measurements, a target position estimator yielding a current target state including target position estimation using said target positioning measurements, a target position predictor predicating a future target trajectory and calculating an interception position and time of a projectile launched by a gun turret and said target; a fire control solution module producing a gun turret azimuth and elevation required for launch of said projectile, and a device control command computation module producing control commands to said actuator using said required gun turret azimuth from said attitude producer to stabilize and implement said required gun turret azimuth and elevation with disturbance rejection.

4. The system, as recited in claim 3, wherein said target position estimator is a Kalman filter.

5. The system, as recited in claim 3, wherein said target position predictor comprises a target position extrapolation module extrapolating said future trajectory of said projectile using said current target state including said target position estimation and system dynamic matrix, a projectile flight time calculation module computing said time of said projectile to fly from said gun turret to said interception position, and an interception position and time determination computing said interception position and time using said predicated future projectile trajectory and projectile flight time.

6. The system, as recited in claim 4, wherein said target position predictor comprises a target position extrapolation module extrapolating said future trajectory of said projectile using said current target state including said target position estimation and system dynamic matrix, a projectile flight time calculation module computing said time of said projectile to fly from said gun turret to said interception position, and an interception position and time determination computing said interception position and time using said predicated future projectile trajectory and projectile flight time.

7. The system, as recited in claim 6, wherein said attitude producer comprises a IMU/AHRS to measure said current attitude of said pointed device.

8. The system, as recited in claim 6, wherein said attitude producer comprises a MEMS IMU to measure said current attitude of said pointed device.

9. The system, as recited in claim 1, wherein said pointing controller comprises a measurement data processing module transforming target positioning measurements, a target position estimator yielding a current target state including target position estimation using said target positioning measurements, a target position predictor predicating a future target trajectory and calculating an interception position and time of a projectile launched by a gun turret and said target; a fire control solution module producing a gun turret azimuth and elevation required for launch of said projectile, and a device control command computation module producing control commands to said actuator using said required gun turret azimuth from said attitude producer to stabilize and implement said required gun turret azimuth and elevation with disturbance rejection.

10. The system, as recited in claim 9, wherein said target position estimator is a Kalman filter.

11. The system, as recited in claim 9, wherein said target position predictor comprises a target position extrapolation module extrapolating said future trajectory of said projectile using said current target state including said target position estimation and system dynamic matrix, a projectile flight time calculation module computing said time of said projectile to fly from said gun turret to said interception position, and an interception position and time determination computing said interception position and time using said predicated future projectile trajectory and projectile flight time.

12. The system, as recited in claim 1, wherein said attitude producer comprises a IMU/AHRS to measure said current attitude of said pointed device.

13. The system, as recited in claim 1, wherein said attitude producer comprises a MEMS IMU to measure said current attitude of said pointed device.

14. A method for automatic stabilization and pointing control of a device, comprising the steps of
   (a) identify a desired pointing direction of said device by providing coordinate of a target;
   (b) determining a current attitude measurement of said device;
   (c) computing platform rotation commands of said device using said desired pointing direction of said device and said current attitude measurement of said device, wherein the step (c) comprises the steps of:
   (c.1) transforming target positioning measurements from a target coordinate producer body coordinates to local level coordinates;
   (c.2) yielding a current target state including target position estimation using said target positioning measurements;
   (c.3) predicting a future target trajectory and calculating interception position and time of a projectile launched by a gun turret and said target;
   (c.4) producing gun turret azimuth and elevation required for launch of said projectile; and
   (c.5) producing control commands using said gun turret azimuth and elevation and said current attitude rate data of said gun turret from a IMU/AHRS to stabilize and implement said gun turret azimuth and elevation with disturbance rejection;
   (d) rotating said device to said desired pointing direction;
   (e) visualizing said target and desired pointing direction and current direction of said device; and
   (f) producing a voice representing a pointing procedure.

15. The method as recited in claim 14, in step (c.3), further comprising the steps of:
   (c.3.1) extrapolating said future trajectory of said projectile using said current target state, including said current target position estimation and system dynamic matrix;
   (c.3.2) computing time of said projectile to fly from said gun turret to interception position; and
   (c.3.3) computing interception position and time using said predicated future projectile trajectory and projectile flight time.

16. The method as recited in claim 15, between the step (c.5) and the step (d), further comprising the steps of:
   combining said computed platform rotation commands with feedback signals;
   computing an automatic stabilization and positioning control signal by a servo controller;
   amplifying a servo controller signals;
   sending said amplified servo controller signals to an actuator;
   converting electric signals to torques and said torque exerted on a platform body to eliminate interference to said platform body; and
   sensing a motion of said platform body and feedback a sensor signal to said servo controller.

17. The method as recited in claim 14, between the step (c.5) and the step (d), further comprising the steps of:
   combining said computed platform rotation commands with feedback signals;
   computing an automatic stabilization and positioning control signal by a servo controller;
   amplifying a servo controller signals;
   sending said amplified servo controller signals to an actuator;
   converting electric signals to torques and said torque exerted on a platform body to eliminate interference to said platform body; and
   sensing a motion of said platform body and feedback a sensor signal to said servo controller.

18. A method for automatic stabilization and pointing control of a device, comprising the steps of
   (a) identify a desired pointing direction of said device by providing coordinate of a target;
   (b) determining a current attitude measurement of said device;
   (c) computing platform rotation commands of said device using said desired pointing direction of said device and said current attitude measurement of said device;
   (d) rotating said device to said desired pointing direction;
   (e) visualizing said target and desired pointing direction and current direction of said device; and
   (f) producing a voice representing a pointing procedure;
   wherein, between the step (c) and the step (d), further comprising the steps of:
   combining said computed platform rotation commands with feedback signals;
   computing an automatic stabilization and positioning control signal by a servo controller;
   amplifying a servo controller signals;
   sending said amplified servo controller signals to an actuator;
   converting electric signals to torques and said torque exerted on a platform body to eliminate interference to said platform body; and
   sensing a motion of said platform body and feedback a sensor signal to said servo controller.

* * * * *

UNITED STATES PATENT AND TRADEMARK OFFICE
CERTIFICATE OF CORRECTION

PATENT NO. : 7,239,975 B2  Page 1 of 1
APPLICATION NO. : 11/212062
DATED : July 3, 2007
INVENTOR(S) : Norman Coleman et al.

It is certified that error appears in the above-identified patent and that said Letters Patent is hereby corrected as shown below:

Column 1, line 11, after the section Cross Reference of Related Application, insert the following paragraph for the Federal Research Statement:

--The present invention is made with U.S. Government support under contract number W15QKN-07-C-0033 awarded by the Department of Army. The Government has certain rights in the invention.--

Signed and Sealed this

Twenty-third Day of October, 2007

JON W. DUDAS
*Director of the United States Patent and Trademark Office*